United States Patent
McMahon (10) Patent No.: US 9,695,757 B2
(45) Date of Patent: Jul. 4, 2017

(54) COMBUSTION ENGINE

(71) Applicant: EHT PATENTS AND LICENSING LIMITED, Liverpool (GB)

(72) Inventor: Gary McMahon, Daresbury Cheshire (GB)

(73) Assignee: EHT P & L Limited, Liverpool (GB)

(*) Notice: Subject to any disclaimer, the term of this patent is extended or adjusted under 35 U.S.C. 154(b) by 225 days.

(21) Appl. No.: 14/354,807

(22) PCT Filed: Oct. 29, 2012

(86) PCT No.: PCT/GB2012/052689
§ 371 (c)(1),
(2) Date: Apr. 28, 2014

(87) PCT Pub. No.: WO2013/061094
PCT Pub. Date: May 2, 2013

(65) Prior Publication Data
US 2014/0309909 A1    Oct. 16, 2014

(30) Foreign Application Priority Data

Oct. 28, 2011  (GB) .................................. 1118634.3
Aug. 20, 2012  (GB) .................................. 1214829.2

(51) Int. Cl.
*F02D 19/08* (2006.01)
*F02D 19/06* (2006.01)
(Continued)

(52) U.S. Cl.
CPC ....... *F02D 19/0602* (2013.01); *F02D 19/066* (2013.01); *F02D 19/0628* (2013.01);
(Continued)

(58) Field of Classification Search
CPC .. F02D 19/06; F02D 19/0607; F02D 19/0642; F02D 19/0644; F02D 19/0647;
(Continued)

(56) References Cited

U.S. PATENT DOCUMENTS

| 4,461,625 A | 7/1984 | Smith et al. |
| 4,463,734 A | 8/1984 | Akeroyd |

(Continued)

FOREIGN PATENT DOCUMENTS

| EP | 1496247 A1 | 1/2005 |
| GB | 2458500 | 9/2009 |

(Continued)

OTHER PUBLICATIONS

International Search Report, PCT Application No. PCT/GB2012/052689, Oct. 29, 2012, 6 pgs.
(Continued)

*Primary Examiner* — Erick Solis
(74) *Attorney, Agent, or Firm* — Dennis A. Bennett; Chris Marion (57) ABSTRACT

The invention relates to a method for improving the efficiency of a combustion engine. The method comprises measuring a quantity of a primary fuel supplied to the combustion engine. Determining an operating state of the combustion engine. Selecting a fuel mapping profile based on an operating state of the combustion engine and determining from the fuel mapping profile an amount of a secondary fuel to be injected as a fraction of the measured quantity of the primary fuel.

19 Claims, 7 Drawing Sheets

(51) Int. Cl.
*F02D 41/00* (2006.01)
*F02D 41/30* (2006.01)

(52) U.S. Cl.
CPC ....... *F02D 19/0647* (2013.01); *F02D 19/081* (2013.01); *F02D 41/0025* (2013.01); *F02D 41/3094* (2013.01); *Y02T 10/36* (2013.01)

(58) Field of Classification Search
CPC ...... F02D 19/066; F02D 19/08; F02D 19/081; F02D 41/0025; F02D 41/0027
See application file for complete search history.

(56) References Cited

U.S. PATENT DOCUMENTS

| | | | |
|---|---|---|---|
| 4,641,625 A | 2/1987 | Smith | |
| 5,370,097 A | 12/1994 | Davis | |
| 5,408,957 A | 4/1995 | Crowley | |
| 5,469,830 A | 11/1995 | Gonzalez | |
| 6,026,787 A | 2/2000 | Sun et al. | |
| 6,612,269 B2* | 9/2003 | Heffel | F02B 43/00 123/1 A |
| 7,546,834 B1 | 6/2009 | Ulrey | |
| 9,334,813 B2* | 5/2016 | Fiveland | F02D 19/0626 |
| 2005/0205021 A1 | 9/2005 | Shute | |
| 2007/0175459 A1 | 8/2007 | Williams et al. | |
| 2008/0098995 A1 | 5/2008 | Lauper et al. | |
| 2011/0297753 A1 | 12/2011 | Mcalister et al. | |
| 2011/0301826 A1 | 12/2011 | Galindo et al. | |
| 2015/0136047 A1* | 5/2015 | Hou | F02D 41/3035 123/3 |
| 2015/0275813 A1* | 10/2015 | Dunn | F02D 41/3094 123/445 |

FOREIGN PATENT DOCUMENTS

| | | |
|---|---|---|
| WO | 9421911 | 9/1994 |
| WO | 9930024 A1 | 6/1999 |
| WO | 2007092711 | 8/2007 |
| WO | 2008036999 A1 | 4/2008 |
| WO | 2009115845 A1 | 9/2009 |
| WO | 2010121306 A1 | 10/2010 |
| WO | 2011154028 A1 | 12/2011 |

OTHER PUBLICATIONS

McMahon, International Preliminary Report on Patentability Chapter II, WO/2013/061094A1, EHT Patents and Licensing Limited, Apr. 28, 2014, 19 pgs.

Diesel Gas Australia, Technical Information, http://www.dieselgasaustralia.com.au/default.aspx?ID=Technical, downloaded Sep. 16, 2016.

International Preliminary Report on Patentability, PCT Application No. PCT/GB2012/052689, Jan. 15, 2014, 19 pages.

* cited by examiner

COMBUSTION ENGINE

CROSS REFERENCE TO RELATED APPLICATIONS

This application is a U.S. national stage filing under 35 U.S.C. §371 of PCT International Application No. PCT/GB2012/052689, filed Oct. 29, 2012, which claims the benefit of priority to Great Britain Application No. 1118634.3 filed Oct. 28, 2011 and Great Britain Application No. 1214829.2 filed Aug. 20, 2012. Each of the above-referenced applications is expressly incorporated by reference herein its entirety.

FIELD OF THE INVENTION

The invention relates to improvements in and relating to combustion engines and in particular, but not exclusively, to improvements in the combustion efficiency of internal combustion engines.

BACKGROUND

The operation of an engine using more than one fuel is known. Many of these systems try reduce the overall fuel cost by utilising a cheaper secondary fuel to displace the usage of a relatively more expensive primary fuel. Systems of this type can either be retrofitted to an existing engine or supplied as an integral part of the engine/vehicle by the manufacturer. There are a large variety of systems produced for the automotive market, particularly the light and heavy goods market, where the fuel costs comprise a significant cost for operators.

There are generally two types of system typically used.

The first type of system works by introducing a secondary fuel in addition to the primary fuel. The quantity of primary fuel is generally unchanged. These are generally known as 'addition' systems. The principle involved is that the introduction of the secondary fuel increases the power/torque of the engine and that an adaptation made either by the original engine control system or by the operator results in a net fuel cost saving. Some systems of this type also employ some crude forms of control in an attempt reduce the primary fuelling, typically by changing the inputs from sensor or modifying torque or speed control inputs.

There are several limitations of such addition systems. The amount of secondary fuel that can be introduced is limited by the ability of the engine to combust the secondary fuel, primarily due to a lack of oxygen, commonly known as "oxygen depletion" and the secondary fuel "quenching" the combustion of the primary fuel. Operation in this mode leads to poor fuel consumption and high emissions due to incomplete combustion and the pass through of un-burnt fuel products that exits the exhaust. The fuel saving generated is not guaranteed and can be negative as well as positive. Deliberate over-powering of an engine will cause it to operate outside of its normal operational. This will have negative implications in terms of manufacturer's warranty, insurance approvals, safety certification and potential engine life.

The second type of system works by introducing a secondary fuel in addition to a reduced quantity of the primary fuel. These are commonly known as 'substitution' systems. The principle involved is that both primary and secondary fuels are directly controlled and that both fuels when combusted simultaneously generate approximately the same power/torque as the original engine when operating only on the primary fuel.

The percentage of the two fuels employed gives rise to a further distinction between systems of this substitution-type. Systems which use a higher proportion of secondary fuel to primary fuel where the primary fuel is diesel and the secondary fuel is gaseous are known as diesel ignition gas engines. Systems which use a lower proportion of secondary fuel to primary fuel where the primary fuel is diesel and the secondary fuel is gaseous retain their classification as diesel engines.

Both types of substitution system are characterised in that they require a minimum of proportion of approximately 25% of secondary fuel to be employed for the system to be commercially viable. As similar figure is necessary for addition systems to be viable, assuming that they can be made to operate in a favourable mode that generates a net fuel cost saving.

U.S. Pat. No. 4,463,734 discloses a diesel engine in which increasing proportions of liquefied petroleum gas (LPG) are metered to the engine as power demand increases, starting from as little as 20% gas and increasing to about 80% gas, where the percentage is given in calorific value. U.S. Pat. No. 4,641,625 discloses a range of gaseous fuel in a liquid gas mixture of between 0 and 95% gas. U.S. Pat. No. 6,026,787 and US 2005/0205021 both disclose dual fuel engines, but without specifying the proportions of the fuels. WO 2008/036999 is directed to a dual fuel system and a dual fuel system assembly where liquid LPG and diesel are mixed and then distributed via the common rail to the combustion chambers. WO 2010/121306 relates to fuel systems for diesel engines. In particular, the invention relates to a dual fuel supply system for a diesel engine having an indirect-injection system. U.S. Pat. No. 5,408,957 discloses LPG (propane), natural gas, hydrogen gas, or the like, is continuously injected at substantially constant pressure into the air intake manifold, or air induction system, of a conventional internal combustion engine, the engine being electronically, or mechanically, controlled to adjust the air to liquid fuel mixture to a optimum value. U.S. Pat. No. 5,370,097 discloses a dual fuel control system for use with an internal combustion engine which controls the flow of liquid fuel alone or in combination with a gaseous fuel. US 2011/301826 discloses a conventional gasoline engine that is retrofitted to operate as a bi-fuel engine calibrated to burn hydrogen gas as a primary fuel and gasoline as a secondary fuel at various acceptable air fuel ratios while avoiding forbidden air fuel ratios. WO 99/30024 relates to a method for producing NOx reductants by injecting hydrocarbon into a diesel engine's combustion chamber during the expansion cycle.

WO 2009/115845 discloses the injection of a small amount of a secondary fuel having a shorter molecular structure than a primary fuel for achieving homogenous combustion. The shorter molecular structure of the secondary fuel is used as an accelerant to accelerate the chemical process and a range of between 5%-25% of the secondary fuel is disclosed. Moreover, both the supply of the primary and the secondary fuel are controlled.

Thus, existing dual-fuel systems have several limitations, such as requiring a minimum fraction of approximately 25% of secondary fuel and/or requiring that the ECU or primary fuel supply are controlled or adapted.

It is therefore desireable to overcome these limitations and/or produce an even greater improvement in fuel efficiency.

According to one aspect of the invention there is provided a method of improving the efficiency of a combustion engine, the method comprising: measuring a quantity of a primary fuel being supplied to the combustion engine; determining an operating state of the combustion engine; selecting a fuel mapping profile based on an operating state of the combustion engine; and determining from the fuel mapping profile an amount of a secondary fuel to be injected as a fraction of the measured quantity of the primary fuel.

According to another aspect of the invention there is provided a combustion engine comprising: a first sensor for measuring a quantity of a primary fuel supplied to the combustion engine; a second sensor for determining an operating state of the combustion engine; a controller selecting a fuel mapping profile based on an operating state of the combustion engine; and the controller determining from the fuel mapping profile an amount of a secondary fuel to be injected as a fraction of the measured quantity of the primary fuel.

According to yet another aspect of the invention there is provided a kit for retrofitting a combustion engine designed to combust a primary fuel, the kit comprising: a tank for holding a secondary fuel; an injector for injecting secondary fuel into the engine; a controller configured to receive: a first input indicating the quantity of the primary fuel being supplied to the engine, and a second input indicating an operating state of the engine; and wherein the controller is configured to select a fuel mapping profile based on the operating state and to determine from the selected fuel mapping profile, an amount of a secondary fuel to be injected by the injector as fraction of the measured quantity of the primary fuel.

According to yet another aspect of the invention there is provided a controller for controlling an injection of a second fuel into an engine supplied with a primary fuel, the controller comprising: a first input for receiving an indication of the quantity of the primary fuel being supplied; a second input for receiving an indication of an operating state of the engine; a memory for storing a plurality of fuel mapping profiles; a processor for selecting one of the fuel mapping profiles based on the second input and determining an amount of the secondary fuel to be injected as a fraction of the measured quantity of the primary fuel.

According to yet another aspect of the invention there is provided a method of improving the efficiency of a combustion engine, the method comprising: measuring a quantity of a primary fuel supplied to the combustion engine; and injecting an amount of a secondary fuel based on a fraction of the measured quantity of the primary fuel, wherein once a threshold quantity of the primary fuel is exceeded, the fraction of secondary fuel decreases as the quantity of primary fuel increases.

According to yet another aspect of the invention there is provided a method of improving the fuel efficiency of an internal combustion engine, the method comprising: measuring a quantity of a primary fuel supplied to the internal combustion engine; injecting an amount of a secondary fuel based on a fraction of the measured quantity of the primary fuel, the primary fuel having a larger molecular structure than the secondary fuel; splitting the primary fuel into smaller molecules using the secondary fuel.

Preferably or optionally, wherein the step of splitting comprises: a first splitting of the secondary fuel to produce radicals by compressing air that is combined with the secondary fuel; and a second splitting of the primary fuel by combining the radicals with the primary fuel.

According to another aspect of the invention there is provided a method of improving the fuel efficiency of an internal combustion engine, comprising the steps of measuring the quantity of a first fuel having a first molecular structure injected into a combustion chamber of the engine during a combustion cycle, and supplying to the combustion chamber a controlled proportional quantity of a second fuel of a shorter molecular structure, wherein the amount by calorific value of the second fuel injected is limited to the Minimum Fraction where significant enhancement of combustion begins and the Maximum Fraction where the inefficiency of combusting the second fuel (for an engine designed to combust first fuel) significantly counters the enhancement effects.

According to yet another aspect of the invention there is provided a method of improving the fuel efficiency of an internal combustion engine, comprising the steps of measuring the quantity of a first fuel having a first molecular structure injected into a combustion chamber of the engine during a combustion cycle, and supplying to the combustion chamber a controlled proportional quantity of a second fuel of a shorter molecular structure, wherein the amount of the second fuel injected is limited so that the mass of the combined fuels injected into the engine for a given level of performance is less than the mass of the first fuel needed to achieve the same level of performance when injected alone.

According to yet another aspect of the invention there is provided a system for improving the fuel efficiency of an internal combustion engine, comprising means for connection to the fuel supply system of the engine, means for measuring the quantity of a first fuel having a first molecular structure injected into a combustion chamber of the engine during a combustion cycle, and means for supplying to the combustion chamber a controlled proportional quantity of a second fuel of a shorter molecular structure, wherein the system comprises: a microprocessor for receiving signals from the measuring means and monitoring means; and wherein the microprocessor is adapted to calculate the quantity of the first fuel injected and produce and transmit a resultant signal to said means for supplying the second fuel.

According to one aspect of the invention there is provided method of improving the fuel efficiency of an internal combustion engine, the method comprising: measuring a quantity of a primary fuel supplied to the internal combustion engine; and injecting an amount of a secondary fuel based on a fraction of less than 15% of the measured quantity of the primary fuel, the primary fuel having a larger molecular structure than the secondary fuel.

BRIEF DESCRIPTION OF THE DRAWINGS

Embodiments of the invention shall now be described, by way of example only, with reference to the accompanying drawings in which.

DETAILED DESCRIPTION

According to one embodiment, improved efficiency of an internal combustion engine is obtained without controlling and/or modifying the ECU, the main combustion chamber or the primary fuel supply of the engine. Instead, the quantity of primary fuel (for example, diesel) being supplied is measured and a controller is able to determine from a predetermined fuel mapping profile, the optimal fractional amount of secondary fuel (for example, gas) that is to be injected.

In one embodiment, the fuel mapping profile determines the fraction of the secondary fuel to be injected as a function of the primary fuel being injected. The fuel mapping profile is based on maintaining the engine in an enhanced co-combustion mode of operation across the range of an engine's operation. In other words, just the right amount of secondary fuel (gas) needs to be injected to maintain the vehicle in this enhanced combustion mode across its range of operation.

According to an embodiment of operation, by optimising the burn (or combustion process), it is possible to use less of the diesel, which results in greater fuel efficiency. The fuel mapping profile selected is therefore based on keeping the engine operating in this enhanced combustion mode of operation over its entire operating range, which results in greater fuel savings. An engine behaves differently under different conditions. A vehicle that is cruising at a steady speed will behave very differently to one accelerating under a heavy load. Therefore, a number of fuel mapping profiles are predetermined, each corresponding to a different state of the engine.

Figure 3:
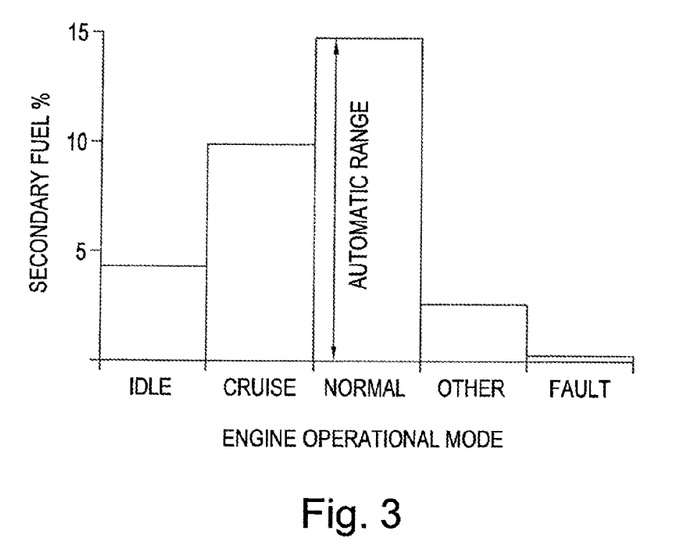
FIG. 3 shows the maximum fraction of the secondary fuel for different operating states of the engine.

FIG. 3 shows a graph indicating various engine states, "idle", "cruise", "normal", "other" and "fault". The "other" state might be a transient mode of operation (heavy acceleration or gear changing etc.). The "stop" state is effectively the same as the "fault" state since the gas system should be available for operation all of the time, but can be isolated.

According to an embodiment, a maximum fraction of the secondary fuel (as a percentage of the primary fuel supplied) is determined for each of the different engine states. For example, in the "normal" state it can be seen that the maximum fraction of the secondary fuel supplied, as a percentage of the primary fuel, is 15%.

Figure 4:
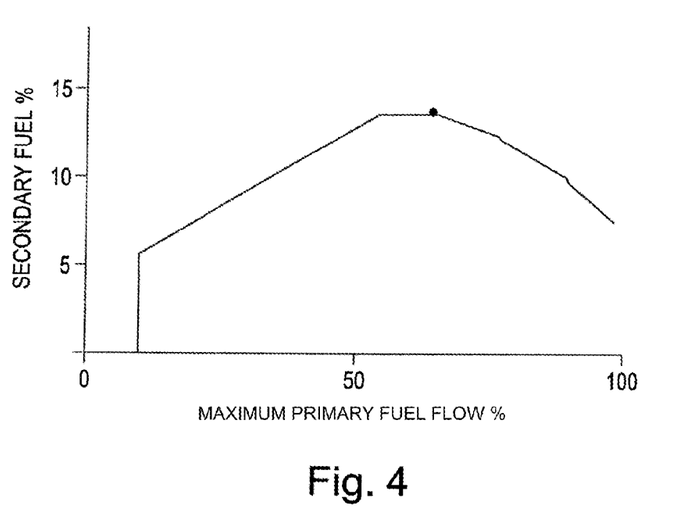
FIG. 4 shows a fuel mapping profile for the "normal" or running mode of operation.

Thus, if the engine is determined as being in the "normal" state, a corresponding fuel mapping profile can be selected as is shown in FIG. 4. The fuel mapping profile has a generally inverted V-shape. This means that initially the fraction of gas to be supplied will increase as the supply of diesel increases. However, once a threshold quantity of the primary fuel has been reached, it has been found that the engine is maintained in the enhanced combustion mode by decreasing the fraction of gas as the diesel increases.

Indeed, FIG. 4 shows an example of a fuel mapping profile according to one embodiment, in which it can be seen that the curve tapers off once a threshold quantity of around 65% of the primary fuel has been exceeded. In other words, the profile shows that initially the fraction of gas to be injected (as a percentage of diesel) increases as the supply of diesel increases, but once the supply of diesel exceeds a threshold value, the fraction of gas to be injected starts to decrease or taper off.

In contrast, conventional dual-fuel systems try control the supply of both the primary and second fuel (diesel and gas). Moreover, this is typically done by employing a linear (and/or proportional) relationship between the level of primary and secondary fuels that are introduced. Indeed, conventional wisdom would suggest that more diesel requires more gas.

However, according to an embodiment of the invention, it has been found that once a threshold value of diesel is exceeded, a more efficient burn is achieved by decreasing the amount of gas introduced as the amount of diesel increases. This tapering (of the fuel map profile) prevents oxygen depletion of the engine in that just the right amount of secondary fuel is supplied to keep the engine operating in the enhanced mode.

An embodiment of the invention controls only the supply of the secondary fuel, relying on the existing controller (ECU) to operate as it is designed to, i.e. to control the supply of the primary fuel (that the engine was designed for). The original ECU monitors and adjusts the primary fuel volume to compensate for how efficiently the fuel is combusted. By operating in co-combustion mode, in effect the same efficiency (or energy given off) can be achieved with less diesel, and the ECU will only notice that less diesel is required.

It is found in an embodiment of the invention that this enhanced mode of combustion can be sustained with only a minimal fraction of gas being injected, i.e. <15% for all engine states, and for some states, considerably lower (see FIG. 3).

The fuel mapping profile of FIG. 4 shows that the function can comprise both linear and non-linear portions. Moreover, some portions of the function can be directly proportional, while another portion can be inversely proportional.

According to an embodiment of the invention, these fuel maps may be established upon start-up of the engine, in which an automatic self-calibration step is performed. In an alternative embodiment, these fuel maps can be predetermined based on extensive tests of different engine states in the laboratory. In another embodiment, predetermined fuel mapping profiles can be determined, but the self-calibration step can be used to alter or refine these predetermined maps over time as the response of the engine changes.

In an embodiment, the fuel mapping profile can be selected by means of measuring particulate emissions. That is, by measuring the non-combusted emissions in the exhaust. In one embodiment, the fuel mapping profile will be determined by taking into account a measurement from a smoke opacity sensor that is located in the exhaust of the vehicle. In this way it is possible to determine the minimum amount of gas necessary to achieve maximum translucency for any given diesel use and/or rpm. It is also possible from this measurement to determine the maximum fuel mapping profile, i.e. the maximum fraction of gas to be injected possible before the smoke (i.e. particulate) increases.

The state of the engine can be determined in various different ways as will become clear.

For example, it is possible to use the primary fuel rail pressure (from an existing engine sensor) and the duration of the primary fuel injector control signal (an output of the original ECU).

In another embodiment, by taking into account the state of the engine (for example by measuring inputs such as the RPM and/or the particulate emissions), a more precise fuel mapping profile can be selected. Embodiments of the invention are therefore able to provide a more accurate fractional range of secondary fuel that is still between 1-15% of the measured quantity of the primary fuel, but where a fuel mapping profile might differ depending on whether a vehicle is cruising along or accelerating under a heavy load. In one embodiment, the exact fraction (or percentage) of this range, is capable of being more accurately determined by not only taking into account the measured quantity of the primary fuel but also the engine state and/or emissions. That is, the engine in an idle state will behave quite differently as to compared to when the vehicle is accelerating or under a heavy load. Embodiments of the invention are able to take these variables into account and being more accurate as to exactly where within the envelope, the fraction (or percentage of the primary fuel) lies. In effect, the fuel mapping profiles act as a sort of multi-dimensional algorithm that is able to take into account other variables.

According to one embodiment, the enhanced co-combustion mode is achieved by a "cracking" process, which fundamentally alters the burn at a chemical level.

Specifically, The secondary fuel is used to crack the primary fuel such that the primary fuel is split into smaller molecules that are easier and more completely combusted. This results in the improved efficiency of an internal combustion engine.

Figure 1:
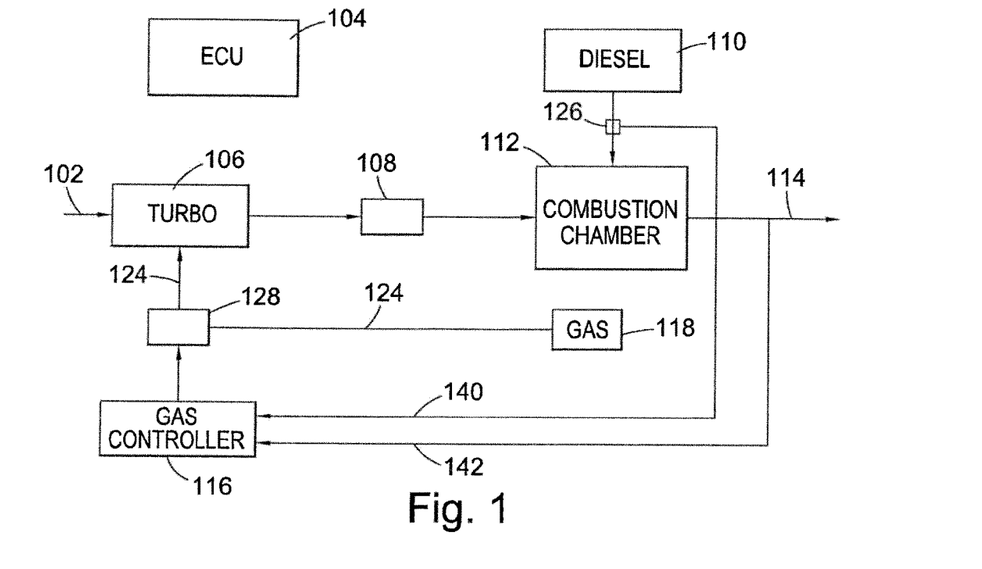
FIG. 1 shows an internal combustion engine according to an embodiment of the present invention.

FIG. 1 shows an embodiment of the invention, in which an internal combustion engine has a turbocharger 106 located upstream of a combustion chamber 112. The turbocharger has a rotating turbine (not shown) that sucks air into it to aid in the combustion process. In the embodiment shown, the gas is injected into the turbo unit 106. This is then mixed with the air creating an even distribution of the air/gas mix, which then enters the combustion chamber 112 and is compressed. This compression of the air/gas mixture splits the short-chained gas into even shorter-chained molecules (or even atoms), known as radicals. The radicals are then present in the combustion chamber 112 and bind with the longer-chained diesel hydrocarbons, causing the diesel to split into shorter molecules that are more easily combusted.

Therefore, only a small amount of gas is needed to improve the combustion of the diesel. The gas is split into smaller components, which splits the diesel into smaller components. This splitting process encourages a chemical chain reaction to take place throughout the chamber which results in a more homogeneous fuel/air mix. In a spark ignition engine, the gas mixes easily with the air and pervades the interior of the engine's combustion chamber. Moreover it burns easily so that it, at least, is entirely combusted and in doing so ensures that all the fuel ignites also. At least, a greater majority of the fuel is combusted in both engine types. Accordingly, the efficiency of the engine is enhanced.

The term "cracking" is broadly understood as a chemical process for the splitting of molecules. In the sense of fuels, different fuels have different molecular structures, some have more complex molecular structures or longer-chained hydrocarbons as compared to others. Different fuels may contain different lengths of hydrocarbon chains or complexity of molecular structure. According to one embodiment the internal combustion engine is designed for use with a first fuel, such as diesel. Diesel is constituted by relatively long-chained hydrocarbon molecules. Cracking enables these long-chained hydrocarbon molecules to be split into shorter-chained hydrocarbon molecules that are more efficiently combusted.

Thus, according to an embodiment the fuel is cracked to improve the efficiency of an internal combustion engine. In one embodiment, this is achieved by ionisation of the gas in mixing it with air and compressing it to produce radicals, which in turn crack the longer diesel hydrocarbon-chains. The principle of cracking is specifically applied by injecting a small amount of a secondary fuel constituted from relatively shorter-chained hydrocarbons, which results in increased efficiency of an internal combustion engine, for example improved fuel efficiency, less emissions, etc. The amount of gas injected is carefully controlled based on the measured quantity of the diesel being used by the engine. More particularly, the exact amount of gas is based on a determined fuel mapping profile (envelope), which according to various embodiments also takes into account other variables such as the state of the engine and/or the particulate emissions in the exhaust.

According to an embodiment, cracking enables the secondary fuel to act as both an accelerant and a reagent (or reactant). Specifically, a reagent brings about a chemical reaction and/or is consumed in the course of the chemical reaction. The radicals, produced by the cracking, induce a chemical reaction by attaching to, and breaking up, the primary fuel into shorter-chained hydrocarbons. Moreover, the resulting shorter-chained hydrocarbons are more easily and more quickly combusted.

According to an embodiment, cracking in the sense of splitting molecules is carried out twice. The gas is cracked and then the diesel is cracked. More specifically, the gas is cracked during a compression phase of the engine cycle, which puts the gas into the physical condition necessary to crack the diesel by (producing radicals). That is, the produced radicals are then present within the air mass during the ignition and combustion phase, splitting up the diesel molecules into smaller molecules that are more easily combusted. In this embodiment, the diesel cracking and ignition/combustion occur simultaneously, but the gas cracking precedes it.

Although enhancement can occur in the range up to 25%, according to a preferred embodiment maximum enhancement occurs in the range from about 1% up to 15%, which are the lower limits and upper limits for reducing diesel particulate emissions.

A conventional internal combustion engine comprises a piston that reciprocates within a cylinder and a crank mechanism for converting the reciprocating movement of the piston into a rotational output. The operation and efficiency of an internal combustion engine depends on a great number of factors, including the type and mixture of fuel used, the compression ratio, the dimensions of the piston/cylinder, the valve timing, the ignition timing, the temperature and distribution of temperature within the combustion chamber. One of the main factors however, that determines the overall efficiency of the engine is the manner in which the fuel is burned, which is typified by the speed and completeness of the combustion process.

Relatively complex hydrocarbon fuels such as diesel have a molecular structure which is long and relatively slow to combust which prevents some of the hydrocarbons from fully burning. Moreover, these long-chain hydrocarbons have a tendency to coalesce, preventing efficient mixing with air or oxygen during the combustion process.

Also, diesel burnt in an enclosed chamber that is externally cooled will tend to ignite first in the centre of the chamber and the ignition will then spread outwards towards the edges of the chamber. If the spread of this flame front is incomplete or inefficient then smoke and particulate matter will result which will be emitted during the exhaust phase of the engine.

A conventional 4-stroke engine has the following stages:
1. an intake stroke, in which air and primary fuel are drawn in,
2. a compression stroke, in which the air and primary fuel are compressed and ignited,
3. a combustion stroke, in which the primary fuel combusts and the piston is displaced.
4. an exhaust stroke, in which the un-combusted particulate is driven out the exhaust.

In a conventional 4 stroke engine, combustion (burning of the fuel) occurs during the "ignition" or "power" stroke of the piston and in most engines the geometry of the engine fixes the displacement and acceleration of the piston during the power stroke. To maximise the efficiency of an engine it is important to burn as much of the primary fuel as possible during the power stroke. However, the chemistry and thermodynamics of combustion place practical limits on the maximum percentage of the fuel that can actually be combusted during the power stroke which generally leads to amount of un-combusted fuel remaining in the cylinder after the power stroke.

Typically, a conventional heavy duty diesel engine combusts only up to 80% of the fuel present in the cylinder during the power stroke.

An embodiment of the invention aims to increase this percentage figure closer to 100%, by enhancing the combustion process.

The main factors that affect the proportion of the available fuel that can be burnt include:
  The nature of the fuel itself. The combustion characteristics which include the cetane and octane rating.
  The dimension of the cylinder. The larger the cylinder volume the longer it will take for the "flame front" to reach the boundaries of the cylinder, which for large dimensions or slow flame fronts at high engine speeds may never occur.
  The timing of the engine. The valve timing and the timing of the initiation of combustion will affect the proportion of fuel burnt. In one embodiment, the engine efficiency is improved by controlling the homogeneity or uniformity of the combustion process. If the source of ignition can be spread throughout the combustion chamber then the combustion process will be less compromised by flame front effects, or temperature variations in the combustion cylinder.

These factors are equally applicable to rotary or turbine engines.

FIG. 1 shows a basic embodiment of an internal combustion engine, but it should be appreciated that other embodiments and configurations are equally applicable. For example, in an alternative embodiment (not shown) the secondary gas is not injected into the turbocharger unit 106. Instead, in one embodiment there is a post-turbo injection unit (not shown). In another embodiment, the secondary fuel is directly injected into the combustion chamber 112

There may be other optional elements such as intercooler 108, which is shown in FIG. 1 as being located between the turbocharger 106 and the combustion chamber 112. The combustion chamber 112 may comprise a variety of different configurations. For example in a six-cylinder vehicle, the combustion chamber 112 may comprise six corresponding manifold branches feeding into six corresponding pistons (not shown). The outlet of the combustion chamber is the exhaust 114 at which all the un-combusted particulate is emitted. The internal combustion engine will have an associated tank 110 for storing diesel and fuel lines for supplying diesel from the tank to the cylinders in the combustion chamber. The operation of the whole system is controlled by the ECU (Engine Control Unit) 104, which monitors and activates the various components of the internal combustion system as is required. The links to the different engine components are not shown. Some of these links between the ECU 104 and the components are optional depending on the vehicle configuration.

In the embodiment of FIG. 1 there are no modifications or adaptations of the ECU, the main fuel supply or the combustion chamber. Instead, a separate gas controller 116 is responsible for controlling the gas injected into the turbocharger 106. The example in FIG. 1 shows a gas supply line 124 extending between the turbocharger 106 and a gas tank 118. In the gas supply line 124, there is an injector 128 that can control the amount of gas that is injected into the air intake prior to the turbocharger 106. Control of the injector 128 is achieved by the control output from the gas controller 116.

An embodiment of the invention provides a practical method for controlling, monitoring and delivering a secondary fuel to an engine. Where the proportion of secondary fuel employed is dependent on the amount of primary fuel employed and the operational state of the engine. The proportion of the secondary fuel employed is generally less than 15% by volume of the primary fuel employed. The technique employed is that of improvement or enhancement of the engine combustion which is managed in real time by the control system.

There is no overt control of the primary fuelling of the engine and any adaptation to the operation of the engine is affected primarily by the improvement in combustion.

According to another embodiment of the invention, the following steps are performed:
1. The volume of the primary fuel used in the engine is calculated in real time.
2. The percentage of secondary fuel required is calculated based on the operational state of the engine
3. The volume of the secondary fuel required is calculated.
4. The injector opening times are calculated to deliver the required volume of secondary fuel.
5. The secondary fuel is introduced into the engine to co-combust with the primary fuel in the engine cylinder.

There are a variety of different ways for implementing each of these steps, which are now described in more detail.

For step 1, the volume of the primary fuel can be determined by measuring the pressure in the primary fuel rail and the opening time of the injector used to introduce the primary fuel into the engine. This applies to both common rail injectors and unit injectors which are the most common primary fuel delivery systems in use on vehicular engines. Additionally the temperature of the primary fuel may be used in the volume calculation. In an alternative embodiment the flow rate of the primary fuel is used in the determination of the instantaneous volume of the primary fuel used. This would be applicable to steady state engines, commonly found in plant or marine applications. In yet an alternative embodiment the pressure in the primary fuel rail could be determined directly from the RPM of the engine. In yet an alternative embodiment the pressure in the primary fuel rail could be determined using data obtained from a data bus connection such as, but not limited to, a CAN bus. In yet an alternative embodiment the opening time of the primary fuel injector could be determined using data obtained from a data bus connection such as, but not limited to, a CAN bus. In yet an alternative embodiment, the amount of air being used in the combustion process could be calculated using the mass air flow, mass air pressure and wide band lambda sensors, either individually or in combination to determine the secondary fuel requirement. In yet an alternative embodiment the instantaneous volume of primary fuel used could be determined using a data obtained from a data bus connection such as, but not limited to CAN bus. In yet an alternative implementation a measure of the exhaust particulates could be used to determine the optimum secondary fuel requirement.

For step 2, the operational state of the engine is determined by a number of inputs, including but not limited to; engine rpm (revolution per minute), primary fuel rail pressure, primary fuel injector opening time, temperature (engine water temperature and ambient outside temperature), orientation and motion of the vehicle. The orientation and motion of the vehicle would typically be determined by an accelerometer that operates in 3 axes, or a combination of tilt switches and speed sensors.

For step 3, in one embodiment the amount of secondary fuel required is calculated based on the amount of primary fuel used and the operational state of the engine. In one embodiment, the operational state of the engine is used to set the percentage of the secondary fuel that is required, at between 0% and 15%. This can be done via a number of methods. In a first embodiment, a user-defined look-up table is used (commonly known as a map) to which a number of the engine inputs, defined above (for example engine rpm) are applied and the output of which is the percentage of secondary fuel required. There may be a plurality of maps for this purpose. In a second embodiment, the percentage of secondary fuel can be set based on the operational states of the engine. This can include but is not limited to a fixed percentage or a percentage that is adjusted automatically as part of a calibration operation.

For step 4, in one embodiment the amount of secondary fuel required is translated into the required opening times for the injectors which control the delivery of the secondary fuel. The injectors can have different characteristics with respect to different fuel flow rates. They may also have different electrical or opening characteristics. The translation of the secondary fuel requirement into activation times for a plurality of injectors shall take into account the characteristics of the secondary fuel injectors, in particular the minimum opening or operating time, below which the delivery of a minimum amount of the secondary fuel cannot be guaranteed.

The relationship between the individual injector opening times and the delivery of the secondary fuel is determined experimentally by a calibration process. The results of this calibration procedure are stored in the non volatile memory in the system.

The injector opening times can be adjusted according to the pressure and temperature of the secondary fuel.

For step 5, according to one embodiment the injectors which control the delivery of the secondary fuel are then driven with an electrical signal designed to open and close the injector with a minimum of latency and also to minimise the steady state electrical power dissipation in the injector. Typically this would be achieved using a peak and hold pulse width modulation technique.

According to an embodiment, the gas controller 116 in FIG. 1 is shown as receiving various control inputs. It is possible to receive inputs from the ECU 104, but this is not shown in the embodiment of FIG. 1. It should be appreciated that a state of the engine can be obtained from the ECU in one embodiment. However, it should be appreciated that the engine state can be monitored in other ways, which require no input from the ECU 804. In one embodiment, the gas controller 116 also has a control input shown from a measurement sensor 126 for determining the quantity of diesel fuel is being used or supplied to the engine in real-time. However, other embodiments describe different ways, both direct and indirect, in which the diesel fuel can be measured and/or determined as has been described above. In one embodiment, the gas controller 116 is implemented using a microprocessor for executing a computer program or algorithm stored in memory of the controller.

The algorithms which control the operation of the system, for example stored in the memory of the gas controller 116 in FIG. 1, can be implemented in software (SW), firmware (FW) or a combination of both.

A state machine consisting of a minimum of five operational engine states shall be used to control the operation of the system, as follows;

Stop—the system is powered but the engine is not operating

Idle—the vehicle is stationary and the engine is idling (no load on the engine)

Cruise—the vehicle is operating at steady state conditions

Normal/Running—the vehicle is operating but not yet satisfying the cruise or idle requirements.

Fault—an operational error has been detected resulting in the shut down of the system.

During the cruise and Idle states the system can perform automatic calibration operations, which can include selection of a fixed percentage, proportion or volume of the secondary fuel to be delivered. Whilst in the stop state the system performs built in test (BIT) and diagnostics operations. Whilst in the running state the system operates normally. Whilst in the fault state the operation of the system is inhibited. This is characterised by the system being stopped in a safe state with the secondary fuel delivery system disabled.

The transition between the states of the state machine shall be controlled by the operational state of the vehicle, the engine and the system. In an alternative embodiment data obtained from a data bus such as CAN could also be used to provide some or all of this information.

Specifically the system shall perform continuous monitoring in all states to determine correct operation of the entire system and the original engine. Additionally the control algorithms shall autonomously record any parameters derived during automatic calibration in a non-volatile memory, for example stored in the gas controller 116 (but not shown).

The idle state shall be determined primarily, but not exclusively, by a combination of the rpm of the engine, the motion of the vehicle and the volume of primary fuel used for a vehicular application. The entry and exit from the idle state shall be controlled by a series of test on the primary inputs which shall include range and persistency.

The cruise state shall be determined primarily but not exclusively by a combination of the rpm of the engine, the motion of the vehicle and the volume of primary fuel used for a vehicular application. The entry and exit from the cruise state shall be controlled by a series of tests on the primary inputs which shall include range and persistency. The cruise state may additionally use a speed input sensor. The entry into the cruise state is not however limited to a particular speed.

In a further embodiment, the system is able to perform an automatic self-calibration on start-up, for tuning the algorithm (executed in the gas controller 116) so that the minimum amount of secondary fuel is used that is necessary to generate the maximum combustion enhancement effect. This results in maximum performance, either in terms of net fuel economy, emissions or a combination of both.

The automatic calibration can be implemented using feedback information obtained from the engine sensors or data bus, or alternatively from dedicated instruments (e.g. lambda sensors, exhaust opacity sensors, temperature sensors). For example, a laser sensor can be inserted into the exhaust pipe of a vehicle to detect the quantity of particulate emissions. This signal is then feedback to the gas controller 116, and the algorithm, can adjust the level of secondary fuel injected accordingly—if indeed particulate emissions are the variable to be controlled.

Typically an improved fuel economy corresponds with a reduction in particulate emissions, since the fuel is being combusted more efficiently. However, in one embodiment it may be that the user (or driver) is able to select one control variable to be paramount over the others. For example, an eco-sensitive driver might prefer to make the control of particulate emissions paramount, and can do this by selecting an eco option, which the algorithm in the gas controller 116 would interpret accordingly. In an alternative embodiment, another driver may prefer to minimise fuel costs and therefore by selecting such an option, the algorithm in the controller would make the control of fuel efficiency paramount.

Although FIG. 1 shows a separate gas controller 116, which operates independently of the ECU 104, it may be that the functionality of the gas controller is incorporated into, or designed to cooperate with, the ECU of the existing engine in an alternative embodiment. Indeed in yet a further embodiment, an ECU may be to replace an existing ECU in being equipped with the gas controller functionality.

The gas controller 116 can be implemented in, and interface with the engine, in various ways. The interfaces can be either analogue or digital or data bus (e.g. CAN) based. The gas controller can be either a single unit, or a number of units depending on the engine type and application. It is envisaged that multiple units will require some form of data or network connection to allow them to operate collectively and possible operate in a master—slave configuration. In another embodiment, the gas controller functionality may also be implemented in part or in total in the ECU which is used to control the primary fuel to the engine. This could be using spare capacity in the original engine ECU 104, or by the use of a replacement ECU designed to control both primary and secondary fuels.

In one embodiment, the gas controller must also be operatively connected to the control and delivery system for the secondary fuel. The gas controller can also be connected to subsystems which are not directly associated with the engine. Typically this would include elements of the chassis control system or the exhaust and emissions systems, which would include any exhaust after treatment.

In another embodiment, the gas controller shall provide the software (SW) and firmware (FW) resources necessary to implement the control system. Typically this would comprise a microprocessor for the SW and field programmable gate array (FPGA) for the FW. It is possible to implement the required functionality using SW or FW alone, or by a combination of both. It is also possible to implement the system using a microprocessor or a FPGA individually. The FPGA is capable of running both SW and FW using a soft core, or embedded microprocessor.

The gas controller shall provide a number of external communications interfaces. These can include Universal Serial Bus (USB—both Host and Device), Ethernet, RS232 and Controller Area Network (CAN). These interfaces provide the capability for the gas controller to operate in a network environment or connect to peripheral components, such as modems, maptop computers, or mass storage devices.

The gas controller shall implement the necessary circuitry to interface with the engine and the secondary fuel gas delivery system. This shall primarily be provided using HW components located on an electronic circuit board, but shall also include FW or SW support as required.

The circuits which interface with the engine shall be designed to provide either galvanic isolation, or if this is not possible, designed to present minimum electrical disturbance to the existing original circuit to which it is connected. This is to ensure that the connection is a far as possible undetectable by the original circuit under normal operating conditions. The circuit elements which control the energetic parts of the secondary fuel delivery system shall be designed so that a single fault does not result in the activation of any part of the secondary fuel delivery system that could present a potential hazard.

Under normal operation conditions the secondary fuel delivery system shall be monitored to ensure that it is operating correctly. If a fault is detected then a fault code is reported and stored in non volatile memory. Dependent on the severity of the fault code, operation of the secondary fuel system can be disabled and not be re-enabled until the fault is rectified. For example, by activating a safety shut-off valves shown in FIG. 2, as well be described in more detail below.

According to one embodiment, the electronic circuit board shall contain dedicated non-volatile memory. This shall be used for storing information such as hardware serial numbers, test results and fault codes and details of the application. The memory can be accessed and programmed using external test equipment which does not require the ECU to be powered. The ECU may incorporate techniques to prevent unauthorised access to the SW and FW programming, calibration and map data. The design of the ECU, electronic circuit board, FW, SW and wiring harness may incorporate techniques to prevent reverse engineering of the product based on observation of the inputs and outputs. The design of the ECU may incorporate a number of monitoring functions (e.g. watchdogs) to check for incorrect operation of either the FW or the SW, the result of which will result in a reset of the affected sub-system.

The gas controller can be physically implemented in different ways. In one embodiment, the gas controller is sealed against water, dust and other contaminants. The ECU shall use a sealed connector system. Ideally this will be a single connector. The electronic circuit board shall have a thermal path via the enclosure to prevent power dissipated in the unit from causing an excessive increase in temperature of the electronic components. The electronic circuit board and enclosure shall be designed to minimise Electromagnetic Emissions (EMI). The electronic circuit board and enclosure shall be designed to minimise Electromagnetic susceptibility. The ECU is designed to be compatible with mounting in an engine bay, or engine room.

Embodiments of the gas controller can be adapted for use with various applications. For example, the gas controller is capable of integration with a global positioning system (GPS) receiver. The system shall be capable of two way communications via a radio frequency (RF) modem (e.g. 3G or GPRS). This shall include the facility to enable or disable the system via this connection. This facility can provide telemetry information about the location and operation of the system. It can also be used to enable the system remotely. This provides protection against theft of the system and additionally provides a method of implementing and policing a pay per use, or lease-based commercial model.

In another embodiment, the controller system is capable of integration with an application programme running on a computer based system. This application would provide control and management for non vehicle applications (e.g. industrial or marine). The system can be customised for the majority of all envisaged applications where necessary by changes to the wiring harness, SW and FW only. It shall be possible to re-programme the unit SW and FW via the external connector. Each ECU shall be programmed with a unique serial number. Each ECU shall be programmed with sufficient details to identify the application. For vehicle applications this could include, engine, chassis or registration number. This information may be obtained automatically (e.g. via CAN) where such facilities exist. The ECU shall implement an OBDII compliant diagnostics and maintenance interface.

Figure 2:
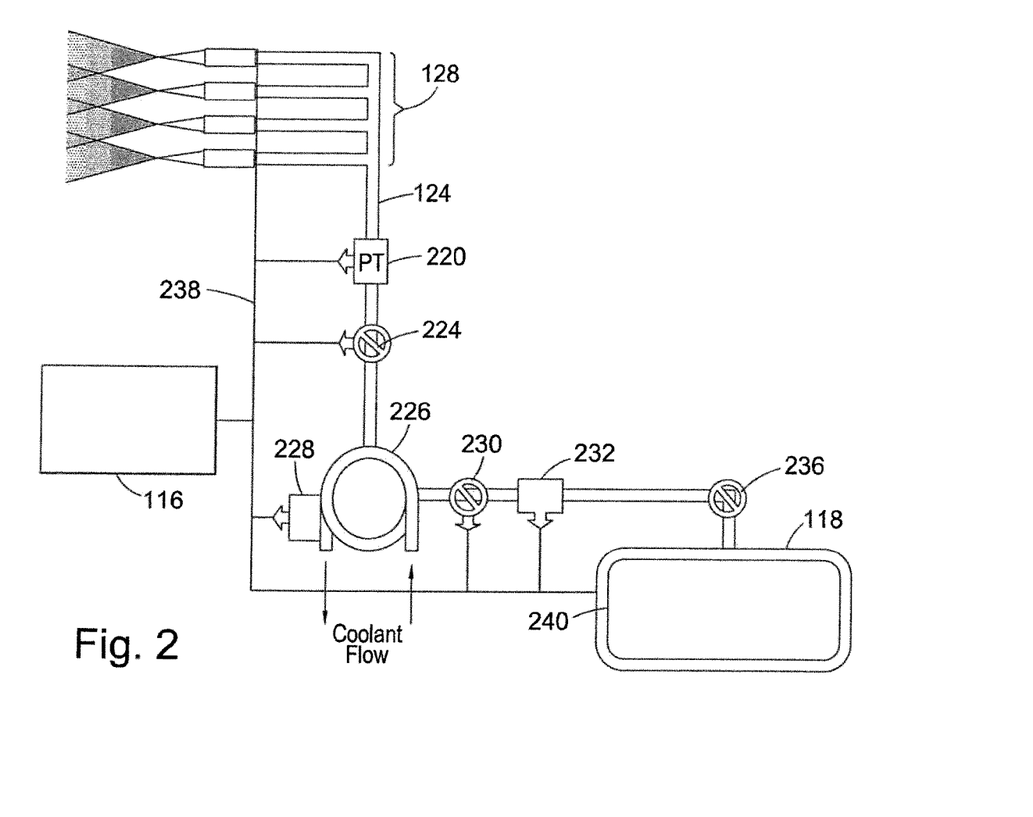
FIG. 2 shows a kit that can be retrofitted to an existing engine according to an embodiment of the present invention.

FIG. 2 shows a kit that can be retrofitted to an existing engine according to an embodiment of the present invention.

The kit comprises a gas controller 116 that controls the injectors 128 (via a control line 238) for supplying a quantity of gas from the gas tank 118 to the existing internal combustion supply line 124. Thus, this kit is intended to be bolted onto an existing internal combustion engine.

The kit shown in the embodiment of FIG. 2 has further optional elements located between the gas tank 118 and the injector 128. For example, a first pressure and temperature sensor 220, two electrical gas valves 224 and 230 able to perform as a solenoid or electrical shut-off, a vapouriser 226 capable of performing a gas regulation function and attached to a temperature sensor 228, a second pressure sensor 232 and a manual gas valve for providing a mechanical shut-off function. The gas tank may be equipped with a float 240. The, electrical and mechanical valves may be installed for safety reasons to enable the gas supply to be shut-off in the event of a fault mode or otherwise.

In another embodiment, the gas controller 116 is configured to have a first input from a diesel injector, a second input from a rail pressure sensor and a third input from a cam sensor (for giving the RPM of the engine at any point in time). It will be appreciated that other inputs are also possible and are used by the gas controller 116 to determine the envelope (or fuel map profile), which in turn will determine the fraction (or percentage) of gas that will be supplied to the engine.

The kit can be retrofitted to a conventional internal combustion with no modifications to the ECU, the combustion chamber or control of the connections supplying it. Whereas many conventional systems describe controlling the quantity of primary fuel, embodiments of the inventions are concerned with controlling the quantity of the secondary fuel based on a measured fractional quantity of the primary fuel. Thus, the system is able to react, rather than invasively control the behaviour of the engine. The ECU of the vehicle will act as per normal, except that the engine will just achieve a more efficient burn.

Figure 5A:
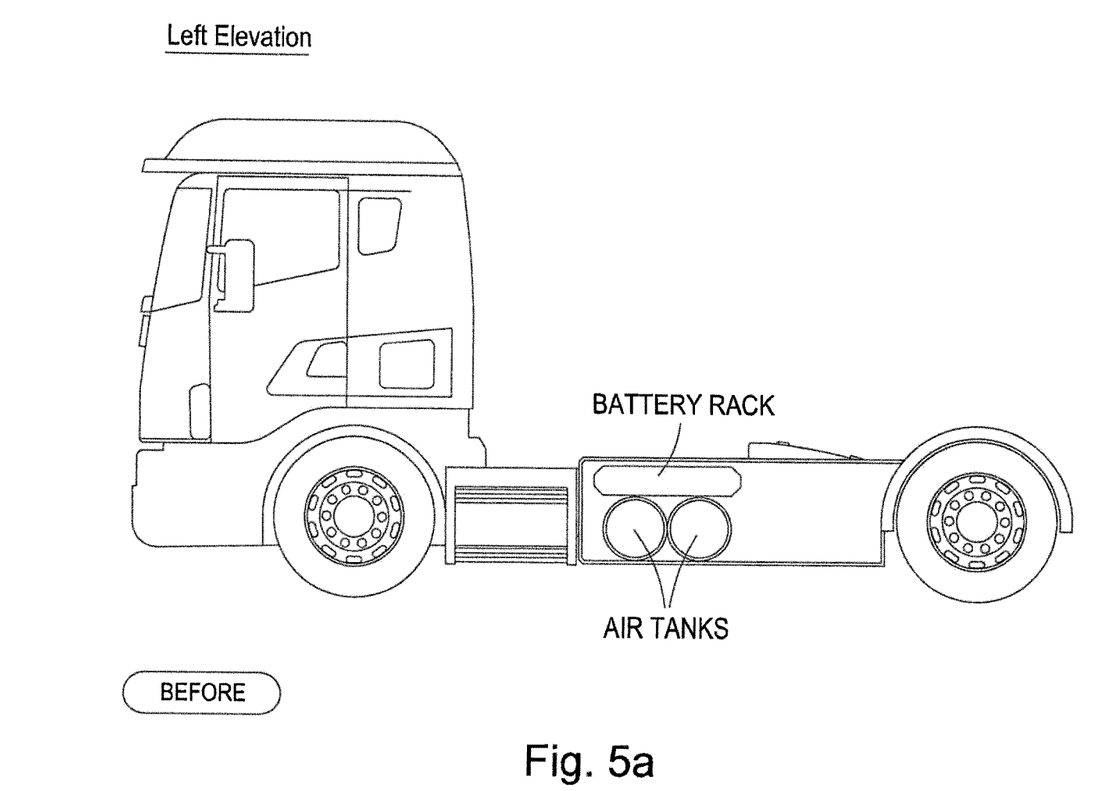
FIG. 5a shows a side view of a vehicle before a retrofit of the gas controller system.
Figure 5B:
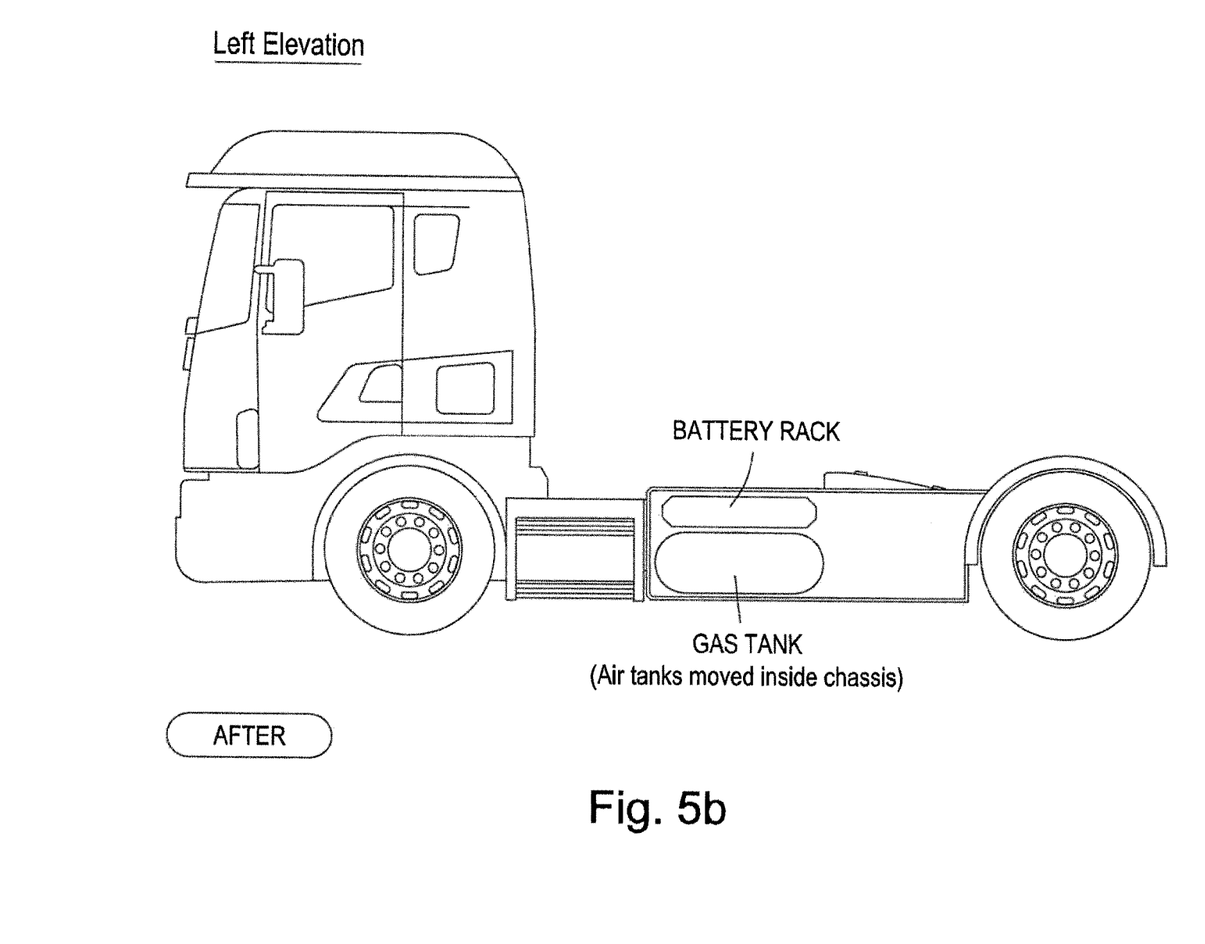
FIG. 5b shows a side view of a vehicle after a retrofit of the gas controller system according to one embodiment.
Figure 5C:
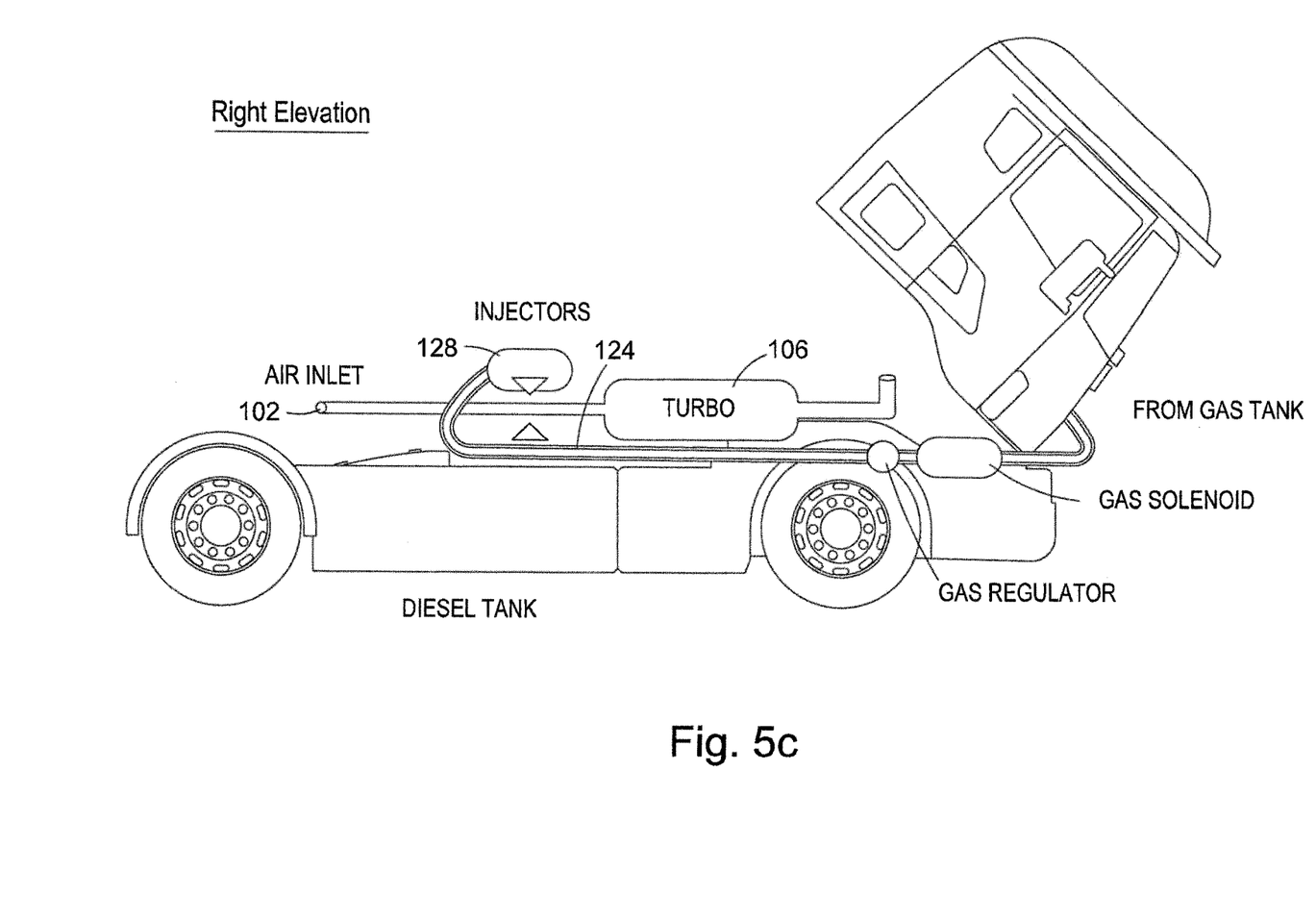
FIG. 5c shows an opposite side view of a vehicle after a retrofit of the gas controller system according to one embodiment.

FIG. 5a-5c show examples of a vehicle before and after a retrofitting operation according to an embodiment of the invention. More specifically, FIG. 5a shows a side view of a vehicle before a retrofit of the gas controller system. In FIG. 5a is shown a side view in which air tanks and a battery pack are fitted to a left hand side of the undercarriage of a truck. In FIG. 5b, after the retrofit, the air tanks have been moved inside the chassis of the truck and have been replaced by a gas tank (i.e. secondary fuel supply). In FIG. 5c, after the retrofit, and when viewed from the opposite side, the vehicle shows gas flowing from the gas tank through a gas solenoid (performing a similar function to the gas valves 224 and 230 in FIG. 2) and a gas regulator (performing a similar function to the gas vapouriser 226 of FIG. 2).

Figure 6:
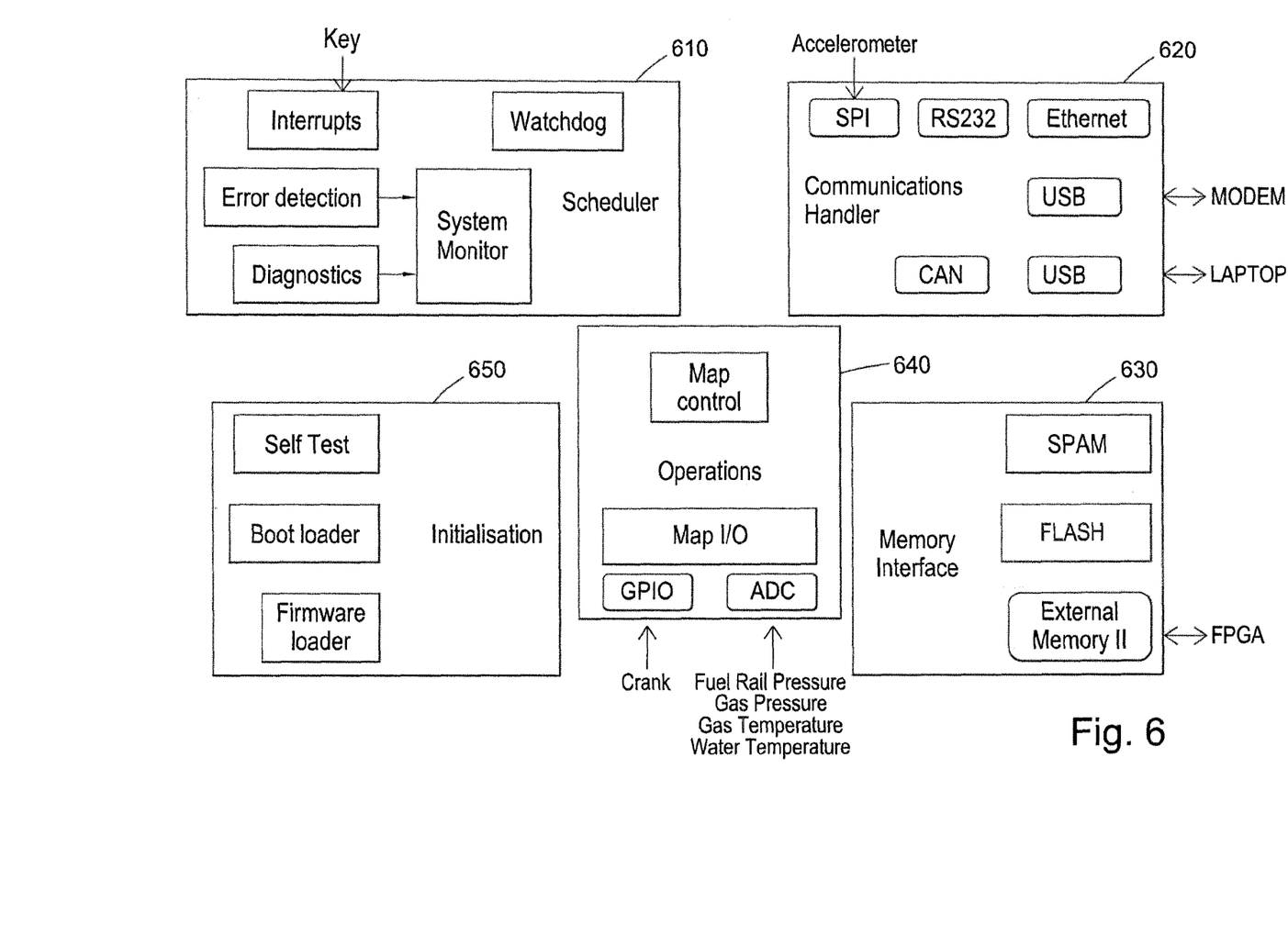
FIG. 6 shows the functionality of the gas controller according to an embodiment of the invention.

FIG. 6 shows an example of a functional (or software) implementation of the functionality of the gas controller 116. FIG. 6 shows a scheduler 610 or operating system for synchronising and scheduling of periodic operations. Also responsible for dealing with asynchronous inputs such as interrupts and internal error detection. A communications handler 620 provides the functionality for enabling the gas controller to connect with various communication interfaces and protocols. It is responsible for driving all communications interfaces, external and internal. Memory interface 630 provides various types of memory functionality and is responsible for interfacing with all memory resources, both internal and external to the processor. The initialisation functionality 650 is responsible for the SW operation immediately following power up. The processor performs a self test and then loads the operational SW from memory. It also loads the FPGA and then configures it with the default settings prior to operation. The operations functionality 640 is responsible for running the algorithms associated with the dual fuel application. It is also able to select and execute the relevant fuel mapping profile based on these inputs to determine which outputs to activate for controlling the fraction of secondary fuel to be injected.

Figure 7:
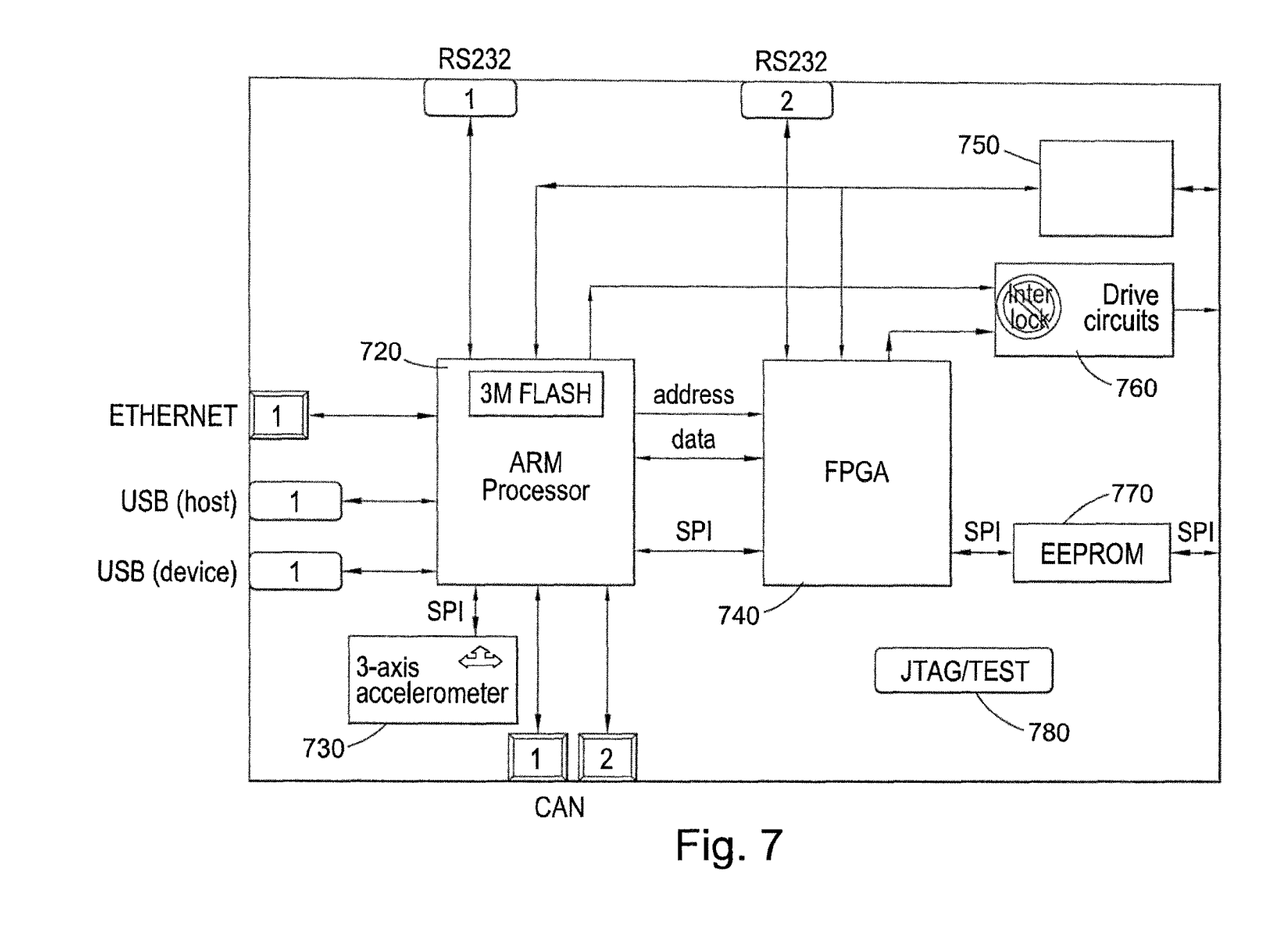
FIG. 7 shows the hardware of the gas controller according to an embodiment of the invention.

FIG. 7 shows an example of the internal electronic architecture of the gas controller 116. This shows the internal electronic architecture of the controller. The processor is a stand alone device. It is responsible for all of the external communications interfaces and supervisory functions. It communicates with an FPGA via a memory mapped interface. The FPGA is responsible for all real time functions. Both devices are required to be operation for the gas system to be activated. A microprocessor 720 is arranged to connect to various I/O interfaces (ETHERNET, USB, RS232, etc), sensors such as a 3-axis accelerometer 730 for determining the vehicle orientation and also other ICs, for example an FPGA 740, monitoring circuits 750 and drive circuits 760. The FPGA 740 is connected to an EEPROM device and there is a JTAG integrated circuit for allowing testing of the board.

It should be appreciated that the functionality and components of FIGS. 6 and 7 are standard in the industry and that other configurations, which are able to implement embodiments of the invention, are also possible.

In summary, according to an embodiment, a primary fuel consisting of relatively long chain hydrocarbon molecules is designed to be combusted in the cylinder of an internal combustion engine. A secondary fuel is able to act as an accelerant, reagent, reactant or catalyst and which is able to co-combust such that when it is introduced into the engine cylinder there is an improvement in the efficiency of the combustion process and hence the efficiency of the engine. According to this embodiment, the simultaneous combustion of both primary and secondary fuels causes the engine to operate with greater efficiency than if the fuels had been combusted individually.

This enhanced combustion effect, or combustion improvement can be attributed to the addition of the secondary fuel causing more complete combustion of the primary fuel and also faster combustion of the primary fuel. This is characterised by greater engine efficiency and lower emission of particulates. Such effects are brought about in one embodiment by splitting the long chain hydrocarbon molecules of the primary fuel into smaller chain hydrocarbon molecules (commonly known as cracking), ionisation of the fuel air mixture in the engine cylinder, increasing the speed and spread of the flame front when combustion occurs and more favourable distribution of the fuel air mixture in the engine cylinder. In a preferred embodiment, the ratio of the secondary fuel is less than 15% of the primary fuel by volume when adjusted for calorific value.

According to an embodiment, a more complete combustion of the primary hydrocarbon fuel is encouraged by introducing a secondary fuel, or a plurality of fuels, to act both as an accelerant and a reagent to create a more homogenous or uniform combustion, resulting in increased efficiency. In an embodiment, increasing the efficiency of an engine means that better fuel economy and/or greater power is available while at the same time improving the emissions standard of the engine by the introduction of a secondary fuel. According to another embodiment, there is provided a convenient method of delivery and control of a secondary fuel so that both primary and secondary fuels may be combusted simultaneously. According to another embodiment, there is provided a convenient method of delivery and control of a secondary fuel, where the secondary fuel is in the gaseous state when introduced into the engine. According to another embodiment, there is provided a secondary fuel delivery and control system that can be easily retrofitted to existing engines to convert them from operating on a single fuel to a plurality of fuels without extensive modification to the engine or its control system. According to another embodiment, there is provided a secondary fuel delivery and control system that can be incorporated by engine suppliers or vehicle manufacturers to facilitate operation with a plurality of fuels without the necessity to re-map or re-calibrate the original engine management system.

The invention claimed is:

1. A method of improving the efficiency of a combustion engine, the method comprising:
    measuring a quantity of a primary fuel supplied to the combustion engine;
    injecting an amount of a secondary fuel based on a fraction of the measured quantity of the primary fuel, and
    varying the amount of the secondary fuel to be injected, so that when the quantity of the primary fuel is below a threshold quantity, the fraction of the secondary fuel to be injected increases as the quantity of primary fuel increases, and once the quantity of the primary fuel exceeds the threshold quantity, the fraction of secondary fuel to be injected decreases as the quantity of primary fuel increases.

2. The method of claim 1, wherein the fraction is less than fifteen percent by volume of the measured quantity of the primary fuel.

3. The method of claim 2, further comprising:
    determining an operating state of the combustion engine;
    selecting a fuel mapping profile based on an operating state of the combustion engine; and
    determining from the fuel mapping profile an amount of the secondary fuel to be injected as a fraction of the measured quantity of the primary fuel.

4. The method of claim 3, wherein the engine has a plurality of operating states, each operating state has a corresponding fuel mapping profile, and wherein each fuel mapping profile is defined within a corresponding minimum and maximum value of the fraction.

5. The method of claim 4, wherein the selected fuel mapping profile is based on a measurement of particulate emissions.

6. The method of claim 5, wherein the primary fuel has a larger molecular structure than the secondary fuel.

7. The method of claim 1, wherein the second fuel is injected with air during a compression stage for splitting the secondary fuel into radicals, which are for splitting the primary fuel into smaller molecules during a combustion stage.

8. The method of claim 7, wherein the injected second fuel causes the splitting of the primary fuel into smaller molecules.

9. The method of claim 8, wherein the splitting of the primary fuel occurs substantially simultaneously with the combustion of the smaller molecules.

10. The method of claim 1, wherein the primary fuel is diesel and the secondary fuel is at least one of liquefied petroleum gas (LPG), compressed natural gas (CNG), liquid natural gas (LNG), methane or hydrogen (Browns gas).

11. A combustion engine comprising:
    a first sensor for measuring a quantity of a primary fuel supplied to the combustion engine;
    a controller for determining an amount of a secondary fuel to be injected based on a fraction of the measured quantity of the primary fuel, wherein the controller is configured to determine that, when the quantity of the primary fuel is below a threshold quantity, the fraction of secondary fuel to be injected increases as the quantity of primary fuel increases, and once the quantity of the primary fuel exceeds the threshold quantity, the fraction of secondary fuel to be injected decreases as the quantity of primary fuel increases.

12. The combustion engine of claim 11, wherein the combustion engine is an internal combustion engine and the primary fuel is diesel.

13. A kit for retrofitting a combustion engine designed to combust a primary fuel, the kit comprising:
    a tank for holding a secondary fuel;
    an injector for injecting secondary fuel into the engine;
    a controller for determining an amount of a secondary fuel to be injected based on a fraction of a measured quantity of the primary fuel, wherein the controller is configured to determine that, when the quantity of the primary fuel is below a threshold quantity, the fraction of secondary fuel to be injected increases as the quantity of primary fuel increases, and wherein once the quantity of the primary fuel exceeds the threshold quantity, the fraction of secondary fuel to be injected decreases as the quantity of primary fuel increases.

14. A controller for controlling an injection of a second fuel into an engine supplied with a primary fuel, the controller comprising:
    a first input for receiving an indication of the quantity of the primary fuel being supplied;
    a processor for determining an amount of a secondary fuel to be injected based on a fraction of a measured quantity of the primary fuel, wherein the processor is configured to determine that i) when the quantity of the primary fuel is below a threshold quantity, the fraction of secondary fuel to be injected increases as the quantity of primary fuel increases, and ii) once the quantity of the primary fuel exceeds the threshold quantity, the fraction of secondary fuel to be injected decreases as the quantity of primary fuel increases.

15. The method of claim 1, wherein once the quantity of the primary fuel exceeds the threshold quantity, decreasing the fraction of secondary fuel to be injected as the quantity of primary fuel increases results in increased combustion efficiency.

16. The method of claim 1, further comprising:
providing a gas controller which controls only the supply of the secondary fuel.

17. A combustion engine as claimed in claim 11, wherein the engine further comprises:
a second sensor for determining an operating state of the combustion engine, wherein the controller selects a fuel mapping profile based on an operating state of the combustion engine, and wherein the controller determines from the fuel mapping profile the amount of secondary fuel to be injected based on a fraction of the measured quantity of the primary fuel.

18. A kit as claimed in claim 13, wherein the controller is configured to receive:
a first input indicating the quantity of the primary fuel being supplied to the engine; and
a second input indicating an operating state of the engine, wherein the controller is configured to select a fuel mapping profile based on the operating state and to determine from the selected fuel mapping profile the amount of a secondary fuel to be injected by the injector based on a fraction of the measured quantity of the primary fuel.

19. A controller as claimed in claim 14, wherein the controller comprises:
a second input for receiving an indication of an operating state of the engine, wherein the processor is configured to select one of the fuel mapping profiles based on the second input and determine from the fuel mapping profile the amount of the secondary fuel to be injected based on a fraction of the measured quantity of the primary fuel.

* * * * *

UNITED STATES PATENT AND TRADEMARK OFFICE
CERTIFICATE OF CORRECTION

PATENT NO. : 9,695,757 B2
APPLICATION NO. : 14/354807
DATED : July 4, 2017
INVENTOR(S) : Gary McMahon

Page 1 of 1

It is certified that error appears in the above-identified patent and that said Letters Patent is hereby corrected as shown below:

On the Title Page

Assignee:
Replace "EHT P & L Limited"
With --EHT P and L Limited--

Signed and Sealed this
Twenty-seventh Day of November, 2018

Andrei Iancu
*Director of the United States Patent and Trademark Office*